Patented May 27, 1924.

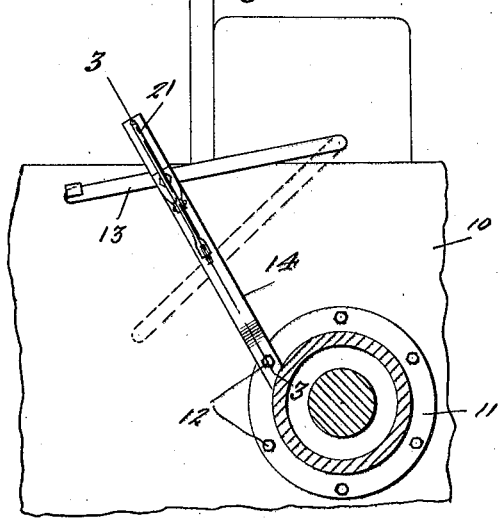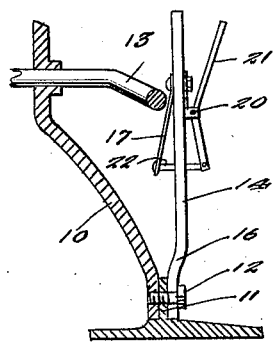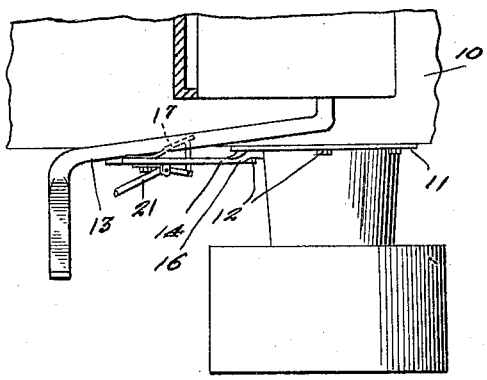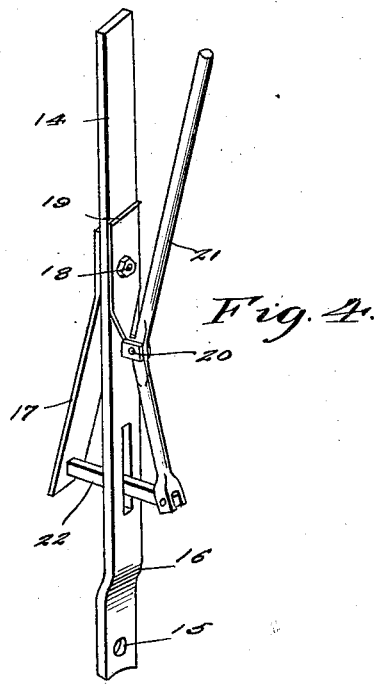

1,495,918

UNITED STATES PATENT OFFICE.

ALSEY AUSTIN MANN, OF BROWNSVILLE, TENNESSEE.

CLUTCH-PEDAL HOLDER.

Application filed May 20, 1922. Serial No. 562,411.

*To all whom it may concern:*

Be it known that I, ALSEY AUSTIN MANN, a citizen of the United States, residing at Brownsville, in the county of Haywood and State of Tennessee, have invented new and useful Improvements in Clutch-Pedal Holders, of which the following is a specification.

This invention relates to attachments for tractors, especially designed for use upon Fordson tractors.

An object of the invention is the provision of a device which may be secured to a Fordson tractor for engagement by the clutch pedal, whereby the clutch may be held in disengaged position to facilitate cranking the engine, or to relieve the operator of the necessity of holding the clutch pedal down and thus permit him to perform other duties without stopping the operation of the engine.

Another object of the invention is the provision of a device of this character which is simple in construction, positive in operation and which may be easily and quickly attached upon one of the bolts already used in the construction of the tractor.

With the above and other objects in view, the invention further includes the following novel features and details of construction, to be hereinafter more fully described, illustrated in the accompanying drawings and pointed out in the appended claim.

In the drawings:—

Figure 1 is a side elevation showing a fragmentary portion of a Fordson tractor with the invention applied thereto.

Figure 2 is a top plan view of the same.

Figure 3 is a vertical sectional view showing the invention in edge elevation.

Figure 4 is a detail perspective view of the attachment removed from the tractor.

Referring in detail to the drawings, wherein like characters of reference denote corresponding parts, the reference charter 10 indicates a portion of a tractor structure, such as the transmission housing, while 11 indicates the cap plate which covers the opening through which the belt pulley is attached, when the tractor is used as a stationary engine, this cap plate being removably secured in place by means of bolts 12. The clutch pedal is indicated at 13 and this pedal and the parts previously described are of the well known construction and form no part of the present invention.

The invention consists of an attachment for engagement by the clutch pedal to hold the latter against the action of its spring, whereby the tractor clutch may be held in disengaged position. For this purpose there is provided a bar 14 having in one end an opening 15 for the passage of one of the bolts 12, while the extremity of the bar adjacent the opening 15 is slightly curved as shown at 16 for engagement with the curved portion of the cap plate 11, whereby the bar will be held against pivotal movement upon the bolt 12. The bar 14 is slightly offset so that its upper end is spaced from the transmission housing 10 and the inner face of this bar has secured thereto one end of a spring arm or plate 17, the opposite end of which extends outwardly from the plate in the path of movement of the clutch pedal 13 when the latter is depressed to disengage the clutch.

Secured to the opposite face of the bar 14 upon a bolt 18 which serves to secure the spring arm or plate 17 in place, is a bracket 19 which has pivotally connected thereto as shown at 20, an operating lever 21. One end of this lever is connected to one end of a link 22, which link passes through an elongated slot provided in the bar 14 and has its opposite end connected to the outer end of the spring arm or plate 17.

When the clutch pedal 13 is depressed to disengage the clutch, it will force the outer end of the spring arm or plate 17 inward toward the bar 14 and as soon as the said clutch pedal passes the end of the spring arm 17, the latter will move away from the bar into the path of the clutch pedal so that the said pedal will engage the link 22 and be prevented from riding off of said link by the extremity of the arm 17. When it is desired to release the clutch pedal to engage the clutch, the said pedal is first pressed slightly downward and the lever 21 operated to move the spring arm 17 inward toward the bars 14 and out of the path of the clutch pedal, whereupon the latter may be moved upward to permit the clutch to engage.

The invention is susceptible of various changes in its form, proportions and minor details of construction and the right is herein reserved to make such changes as properly fall within the scope of the appended claim.

Having described the invention what is claimed is:—

A clutch pedal holder for tractors comprising a bar having one end secured to the tractor below the clutch pedal and provided with an elongated slot, a spring arm having one end secured to the inner face of the bar and its opposite end extending outwardly from said bar, a lever pivotally mounted upon the opposite face of the bar and a link extending through the slot of the bar and having one end secured to the spring arm and its opposite end secured to the pivoted lever, said link being adapted to be engaged by the clutch pedal to hold the latter against movement and to provide means whereby operation of the pivoted lever will move the spring arm inward to release the clutch pedal.

In testimony whereof I affix my signature.

ALSEY AUSTIN MANN.